United States Patent [19]

Quentin

[11] Patent Number: 4,709,005
[45] Date of Patent: Nov. 24, 1987

[54] THERMOTROPIC AROMATIC POLYESTERS

[75] Inventor: Jean-Pierre Quentin, Lyons, France

[73] Assignee: Rhone-Poulenc Recherches, Courbevoie, France

[21] Appl. No.: 818,290

[22] Filed: Jan. 13, 1986

[30] Foreign Application Priority Data

Jan. 11, 1985 [FR] France ................................ 85 00552

[51] Int. Cl.$^4$ ............................................ C08G 63/02
[52] U.S. Cl. .................................... 528/194; 528/176; 528/191; 528/193
[58] Field of Search ................. 528/176, 191, 193, 194

[56] References Cited

U.S. PATENT DOCUMENTS

| 4,265,802 | 5/1981 | Choe | 528/193 X |
| 4,337,191 | 6/1982 | Favstritsky | 528/193 X |
| 4,599,397 | 7/1986 | Yoshimura et al. | 528/193 X |

Primary Examiner—Lucille M. Phynes
Attorney, Agent, or Firm—Sherman & Shalloway

[57] ABSTRACT

High molecular weight thermotropic aromatic polyesters having flow temperatures ranging from 200° to 350° C., and well adopted for molding into mechanically improved shaped articles, e.g., fibers and films, are comprised of recurring structural units of the formulae (I), (II), (III) and (IV), wherein (I) is the structural unit:

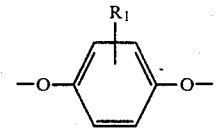

in which $R_1$ is methyl, ethyl, chlorine or bromine, said structural units (I) either being identical or different; (II) is the structural unit:

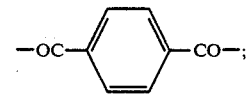

(III) is the structural unit:

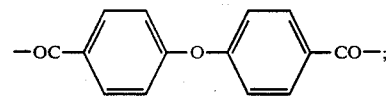

(IV) is the structural unit:

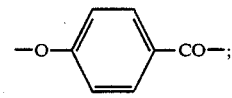

and further wherein the molar ratio of the structural units (I) relative to the total amount of the structural units (II)+(III) ranges from 0.95 to 1.05; the amount of the structural units (II) in the mixture of structural units (II)+(III) ranges from 0 to 70 mole % and the amount of the structural units (III) in said mixture ranges from 100 to 30 mole %; and the amount of the structural units (IV), relative to the amount of the structural units (I), ranges from 10 to 300 mole %.

11 Claims, No Drawings

THERMOTROPIC AROMATIC POLYESTERS

BACKGROUND OF THE INVENTION

1. Field of the Invention

The present invention relates to novel, moldable thermotropic aromatic copolyesters prepared from (i) at least one substituted hydroquinone, or derivative thereof, (ii) a mixture of aromatic dicarboxylic acids, or derivatives thereof, and (iii) at least one aromatic carboxylic hydroxyacid, or derivative thereof.

2. Description of the Prior Art

Thermotropic polyesters are known to this art which are prepared from one or more diphenols and one or more aromatic and/or cycloaliphatic dicarboxylic acids. Polyesters of this type are disclosed, for example, in French Pat. No. 2,270,282; among the polyesters described therein, those prepared from a substituted hydroquinone, or derivative thereof, from terephthalic acid, or derivative thereof, and from 4,4'-dicarboxydiphenyl ether, or derivative thereof, are species of considerable interest.

Because of economic reasons and the high cost of raw materials, considerable research has been carried out by the assignee hereof to replace a portion of the most costly reactants, namely, the substituted hydroquinone or derivative thereof, and 4,4'-dicarboxydiphenyl ether or derivative thereof, with a compound of the hydroxyacid type, which is less costly and is readily commercially available. Such research has also sought to overcome a disadvantage of these particular copolyesters, namely, that the final mechanical properties are inadequate and need to be improved, especially the torsional and/or tensile and/or flexural moduli and/or the resilience values thereof.

SUMMARY OF THE INVENTION

Accordingly, a major object of the present invention is the provision of a new class of mechanically improved thermotropic aromatic copolyesters, said novel copolyesters being prepared from a para-hydroxybenzoic acid comonomer or derivative thereof.

Briefly, the present invention features novel thermotropic aromatic copolyesters capable of being shaped or molded and having a high molecular weight, the minimum value of which corresponding to an inherent viscosity of 0.3 dlg$^{-1}$, said novel copolyesters comprising recurring structural units of the formula (I), and recurring structural units of the formulae (II), (III) and (IV), with:

(I) representing the structure:

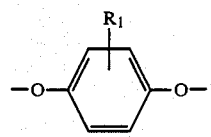

in which $R_1$ is a methyl or ethyl radical or a chlorine or bromine atom, the units (I) either being identical or different from each other;

(II) representing the structure:

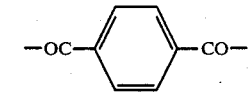

(III) representing the structure:

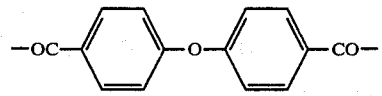

(IV) representing the structure:

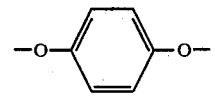

and further wherein the molar ratio of the recurring units (I) relative to the total amount of the recurring units (II)+(III) ranges from 0.95 to 1.05; the amount of recurring units (II) in the mixture (II)+(III) ranges from 0 to 70 mole % and the amount of recurring units (III) in said mixture ranges from 100 to 30 mole %; the amount of recurring units (IV), relative to the amount of the recurring units (I), ranges from 10 to 300 mole %; and the product copolyesters have a flow temperature ranging from 200° to 350° C.

DETAILED DESCRIPTION OF THE INVENTION

More particularly according to the present invention, the recurring units of the formula (I) are derived from a hydroquinone which is monosubstituted (by a methyl or ethyl radical, or by a chlorine or bromine atom) or from a diester thereof. It should be appreciated that the recurring units (I) may also be derived from a mixture of two or more monosubstituted hydroquinones or diesters thereof, each comprising a comonomer according to the present invention.

The recurring units of the formula (II) are derived from terephthalic acid or from an ester-forming derivative thereof, such as, for example, a dihalide or diester.

The recurring units of the formula (III) are derived from 4,4'-dicarboxydiphenyl ether or from an ester-forming derivative thereof, such as, for example, a dihalide or diester.

The recurring units of the formula (IV) are derived from parahydroxybenzoic acid or an ester-forming derivative thereof, such as, for example, the compound obtained by esterifying the phenol moiety, or the compound obtained by esterifying the acid group or a halide of the acid group.

In a preferred embodiment of the invention the subject copolyesters have a structural formula as defined above, in which the amount of the recurring units (II) in the mixture (II)+(III) ranges from 20 to 60 mole % and that of the recurring units (III) in said mixture ranges from 80 to 40 mole %; and the amount of the recurring units (IV), which is expressed relative to the amount of the recurring units (I), ranges from 30 to 200 mole %.

From among said preferred aromatic copolyesters, those which are the more preferred are the polymers having a structural formula in which the recurring units (I) are identical, with the substituent $R_1$ being a methyl radical or a chlorine atom. Such recurring units (I) are derived from methylhydroquinone or from chlorohydroquinone, or diesters thereof.

With regard to inherent viscosity, same is measured at 25° C. on a solution containing 0.5 g of copolyester per 100 cm$^3$ of a parachlorophenol/1,2-dichloroethane (50/50 by volume) solvent mixture. The copolyesters according to the present invention have an inherent viscosity of at least 0.3 dlg$^{-1}$; preferably, they have an inherent viscosity of at least 0.5 dlg$^{-1}$, more preferably ranging from 0.5 to 4.0 dlg$^{-1}$.

With respect to the flow temperature, this preferably ranges from 260° to 330° C. By the "flow temperature" there is intended that temperature at which the edges of a specimen in the form of a polymer sliver or a cut fiber begin to rounden. This temperature is determined by visual observation of the specimen on a cover slip at a suitable rate of increase in temperature, generally on the order of 10° to 20° C./minute, the observation being made under a microscope fitted with a heated stage and marketed under the trademark Thermopan.

The copolyesters according to the present invention also include polymers which additionally comprise ester-forming aromatic units (dioxy units and/or dicarbonyl units and/or mixed oxy/carbonyl units) having a structure other than that of the recurring units (I), (II), (III) and (IV), said additional units being present in proportions which are selected such as not to adversely affect the thermotropicity of the copolyesters of the invention. Representative of such "additional" units are the following:

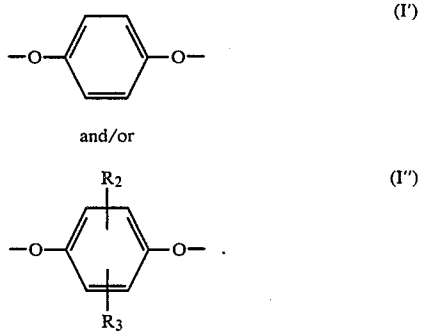

and/or

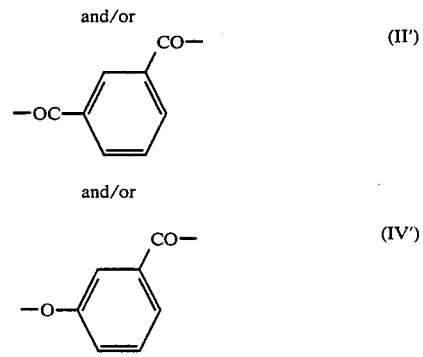

wherein $R_2$ and $R_3$, which may be identical or different, each have the definition given above for $R_1$, the units (I″) being identical or different from each other, and/or (II′)

and/or (IV′)

The units of the formula (I′) are derived from unsubstituted hydroquinone or from diester thereof.

The units of the formula (I″) are derived from a disubstituted hydroquinone or from diester thereof, or from a mixture of disubstituted hydroquinones or from their diesters.

The units of the formula (II′) are derived from isophthalic acid or from a derivative thereof, such as, for example, a dihalide or a diester.

The units of the formula (IV′) are derived from metahydroxybenzoic acid or from a derivative thereof.

In general, the total amount of the additional units which may be present and, in particular, the total amount of the units (I′) and/or (I″) and/or (II′) and/or (IV′) will not exceed 10 mole % relative to the amount of the units (I). Of course, the total amounts of all dioxy units and of all dicarbonyl units which are then present in the copolyester will have to be such that the molar ratio of the totality of the dioxy units relative to the total sum of the dioxy units+totality of the dicarbonyl units will range from 0.95 to 1.05.

The copolyesters according to the present invention have the important characteristic of being thermotropic, that is to say, they are capable of forming anisotropic melts which are easy to shape by spinning, coverting into film or molding; the thermotropy is readily demonstrated when the polymer is observed in the molten state in an optical system equipped with two crossed polarizers (90°): birefringence is produced in anisotropic specimens and polarized light is transmitted through the crossed polarizers. The demonstration of the anisotropy of the polyesters according to the present invention was carried out by the thermo-optical method TOT described in French Pat. No. 2,270,282.

As a result of this, the melts in the anisotropic state have a specific orientation and a relatively high degree of organization which are maintained in articles shaped therefrom, such as fibers, films and molded articles, endowing them (even in the crude state) with improved properties such as modulus and tenacity, while this is not typically observed in isotropic crude products.

It should be noted that these anisotropic melts have an anisotropy range which extends over at least 30° C. By "anisotropy range" there is intended the temperature interval which begins at the temperature at which the birefringence and the transmission of light through the two crossed polarizers appear, and extends upward from said temperature, the interval having a variable upper limit and the melt, within this interval, being anisotropic without any risk of decomposition of the copolyester.

The copolyesters according to the present invention may be shaped by any known process, such as molding, spinning or film formation, and by operating, of course, in the anisotropy range, to produce articles which have satisfactory properties. The presence of mixed oxy/carbonyl units (IV) in the structure of the copolyesters according to the present invention makes it possible to reduce the average price of the raw materials and consequently to minimize the cost of production of shaped articles derived from these copolyesters. Furthermore, for example in the case of molded articles, a marked improvement may be noted (relative to the case in the absence of such mixed units) in the values of certain mechanical properties, especially the values of the torsional and/or tensile and/or flexural moduli and/or the resilience values. In addition, better retention of the mechanical properties with varying temperature is observed.

It is possible to increase the mechanical properties further, particularly those of thin articles, by heat treatment at an elevated temperature, below the melting point of the polymer.

Depending upon the intended application thereof, the copolyesters according to the invention can include additives such as, especially, colorants, stabilizers against the action of light, of oxygen and of heat, extruders or reinforcing fillers and fireproofing agents.

The copolyesters according to the present invention may be prepared by various known polymerization processes.

For example, they may be prepared by reacting: (1) methyl- and/or ethyl- and/or chloro- and/or bromohydroquinone, optionally mixed with another (or other) diphenol(s), such as, for example, unsubstituted hydroquinone and/or one or more hydroquinone(s) disubstituted by the abovementioned groups, with (2) optionally, a derivative of terephthalic acid by itself or optionally mixed with a derivative of another aromatic dicarboxylic acid, such as, for example, isophthalic acid, and with (3) a derivative of 4,4'-dicarboxydiphenyl ether, and with (4) a derivative of para-hydroxybenzoic acid where the acid group is concerned, by itself or optionally mixed with a derivative, of the same type, of another aromatic hydroxyacid such as, for example, meta hydroxybenzoic acid, the said acid derivative being either a halide such as, for example, a chloride, or an aryl ester such as, for example, a phenyl, toluyl or naphthyl ester (the said derivative being, of course, a dihalide or a diester in the case of a dicarboxylic acid). The reaction is generally carried out in the presence of a catalyst such as those mentioned in Canadian Pat. No. 735,543.

In this process, the reactants are employed in proportions such that:

(i) the molar ratio diphenol(s)/diacid derivatives is in the range from 0.95 to 1.05;

(ii) the amount of the terephthalic acid derivative in the mixture derived from terephthalic acid + derivative of 4,4dicarboxydiphenyl ether is in the range from 0 to 70 mole %, and preferably from 20 to 60 mole %;

(iii) the amount of the para-hydroxybenzoic acid derivative is in the range from 10 to 300 mole % relative to the amount of monosubstituted hydroquinone(s), and preferably from 30 to 200 mole %;

(iv) the total amount of the reactants employed, other than the monosubstituted hydroquinone(s), the terephthalic acid derivative, the 4,4'-dicarboxydiphenyl ether derivative and the para-hydroxybenzoic acid derivative does not exceed 10 mole % relative to the amount of monosubstituted hydroquinone(s).

The copolyesters obtained according to this first process generally have end groups which are of the phenolic H type on the one hand, and of the halo or aryloxy type, on the other hand.

It is also possible to prepare the copolyesters according to the invention by direct esterification among the intended diphenol(s), the aromatic dicarboxylic acids, and the aromatic hydroxyacid(s). The copolyesters obtained in this manner generally have end groups of the phenolic H and acid OH type.

Preferably, however, a third process is used, employing an acidolysis reaction. In accordance with this preferred process, the reactants are:

(1) a diester of methyl- and/or ethyl- and/or chloro- and/or bromohydroquinone, optionally mixed with a diester (or diesters) of another diphenol (or of other diphenols) such as, for example, unsubstituted hydroquinone and/or one or more hydroquinone(s) disubstituted by the abovementioned groups; and (2) optionally, terephthalic acid, by itself or optionally mixed with another aromatic dicarboxylic acid such as, for example, isophthalic acid; and (3) 4,4'-dicarboxydiphenyl ether; and (4) an ester of para-hydroxybenzoic acid (the ester bond being at the phenol group), by itself or optionally mixed with an ester of the same type of another aromatic hydroxyacid such as, for example, meta-hydroxybenzoic acid, the said diphenol diester and the said hydroxyacid ester (the ester bond being at the phenol group) being formed from an alkanoic acid containing from 2 to 6 carbon atoms such as, for example, an acetic acid ester.

In this case as well, the reaction is generally carried out in the presence of a catalyst such as, in particular, sodium, magnesium, manganese and zinc acetates, butyl titanate or antimony trioxide. Generally it begins at a temperature above 250° C., after which the acid which is formed distils off. After approximately 80% of the theoretical amount of acid to be distilled has been collected, the temperature is gradually raised to a value above 280° C. while the pressure is gradually reduced. When the distillation of the acid is completed, the polycondensation is continued in a high vacuum for a period which may extend up to 30 minutes.

In this acidolysis process the reactants are employed in proportions such that:

(i) the molar ratio diester(s) of diphenol(s)/total diacids is in the range from 0.95 to 1.05;

(ii) the amount of terephthalic acid in the mixture of terephthalic acid +4,4'-dicarboxydiphenyl ether is in the range from 0 to 70 mole % and preferably from 20 to 60 mole %;

(iii) the amount of ester of para-hydroxybenzoic acid (the ester bond being at the phenol group) is in the range from 10 to 300 mole % relative to the amount of diester(s) of monosubstituted hydroquinone(s), and preferably from 30 to 200 mole %;

(iv) the total amount of the reactants used, other than the diester(s) of monosubstituted hydroquinone(s), terephthalic acid, 4,4'-dicarboxydiphenyl ether and the ester of para-hydroxybenzoic acid does not exceed 10 mole % relative to the amount of diester(s) of monosubstituted hydroquinone(s).

The copolyesters produced in accordance with this third process generally have end groups of the alkoxy type, on the one hand, and of the acid OH type, on the other hand.

In order to further illustrate the present invention and the advantages thereof, the following specific examples are given, it being understood that same are intended only as illustrative and in nowise limitative.

In said examples to follow, a number of control tests were carried out on the copolyesters obtained. The operating procedures and/or the standards according to which these control tests were carried out are set forth immediately below:

(a) Torsional modulus:

This was determined at various temperatures by the use of an automatic torsion pendulum at a frequency on the order of 1 hertz, according to ISO standard R 537, method B, the specimens being conditioned at an RH of 50 according to French standard NF T 51 014. The results are expressed in Mpa.

(b) Tensile test:
The tensile strength and modulus were measured at 23° C. in accordance with the information in French standard NF T 51 034, on specimens of the dumbbell type, 4 mm in width and 2 mm thick, conditioned at an RH of 50. The results are expressed in Mpa.

(c) Flexural modulus:
This determination was carried out at 23° C. according to the information in French standard NF T 51 001 on bar-type specimens 80×8×4 mm in size, conditioned at an RH of 50. The results are expressed in Mpa.

(d) Charpy impact strength:
This was determined at 23° C. according to the information in French standard NF T 51 035 on bar-type specimens, 60×10×4 mm in size, U-notched and conditioned at an RH of 50. The results are expressed in $kJ/m^2$.

EXAMPLE 1

The following reactants and catalyst were introduced into a stirred and heated polycondensation reactor equipped with a device for distillation and for sweeping with an inert gas:

1. methylhydroquinone diacetate: 52.05 g
   [molar ratio (1)/(2)+(3)=1]
2. terephthalic acid: 16.6 g
   [40 mole % in the mixture (2)+(3)]
3. 4,4'-dicarboxydiphenyl ether: 38.7 g
   [60 mole % in the mixture (2) +(3)]
4. para-acetoxybenzoic acid: 27 g
   [60 mole % relative to (1)]
5. magnesium acetate: 0.067 g
   [500 ppm].

The reactor was purged with nitrogen and then heated with a metal bath controlled at a temperature of 265° C. After a few minutes acetic acid began to distil off, the first drop of acid which distilled over corresponding to time zero. After 18 minutes, 23 cm³ of acetic acid were collected (62% of theory). The temperature of the metal bath was then gradually raised up to 330° C. over 39 minutes; at the same time, the pressure was reduced from 1,010 10² Pa to 13.3 10² Pa. Heating was continued for 20 minutes at 330° C. while the pressure was reduced to 0.39 10² Pa at the same time. The total volume of distilled acetic acid was 36 cm³ (i.e., 97.3% of theory).

The polymer obtained was white and fibrous in appearance. It had an inherent viscosity of 2.27 dlg⁻¹. Its flow temperature was 290° C. The anisotropy range extended from 200° C. up to above 360° C.

The values of the torsional modulus as a function of the temperature are reported in Table 1 below.

The results of tensile, flexural and impact measurements are reported in Table 2 below.

As regards the molded specimens which permit the mechanical properties to be measured, these were prepared by means of a screw press marketed under the trademark KAP. For this purpose, the copolyester obtained was ground and then dried at 150° C. for 4 hours and the granules produced were injectionmolded under the following conditions:
  (i) Melting chamber temperature: 350° C.
  (ii) Mold temperature: 50° C.
  (iii) Injected material pressure: 22.5 Mpa.

By way of a comparative test (test A), the same conditions as those described above were reproduced, but this time no para-acetoxybenzoic acid was used. The reactants and the catalyst employed were therefore as follows:

1. methylhydroquinone diacetate: 52.05 g
   [molar ratio: (1)/(2)+(3)=1]
2. terephthalic acid: 16.6 g
   [40 mole % in mixture (2)+(3)]
3. 4,4'-dicarboxydiphenyl ether: 38.7 g
   [60 mole % in mixture (2)+(3)]
4. magnesium acetate: 0.054 g
   [500 ppm].

In this test, a volume of 27 cm³ of acetic acid was recovered (i.e., 94.4% of theory). The polymer obtained was white and fibrous in appearance. It had an inherent viscosity of 1.78 dlg⁻¹. Its flow temperature was 280° C. The anisotropy range extended from 280° C. to above 360° C.

TABLE 1

| | | \multicolumn{10}{c}{T °C.} |
|---|---|---|---|---|---|---|---|---|---|---|---|
| | | −40 | 0 | 20 | 60 | 80 | 100 | 120 | 140 | 180 | 200 |
| Torsional modulus (Mpa) | Ex. 1 | 1500 | 1200 | 1000 | 800 | 750 | 650 | 480 | 360 | 300 | 280 |
| | Test A | 1300 | 1100 | 900 | 700 | 600 | 500 | 400 | 200 | 150 | 130 |

As can be seen from Table 1, the polymer according to the present invention was found to have a better retention of the modulus with varying temperature. The ratio: modulus at 20° C./modulus at 200° C. was equal to 3.57 for the polymer of Example 1, while it was equal to 6.92 for the polymer of test A.

EXAMPLE 2

The following materials were introduced into the same apparatus as that described in Example 1:
1. methylhydroquinone diacetate: 50.05 g
   [molar ratio (1)/(2)+(3)=1]
2. terephthalic acid: 16.6 g
   [40 mole % in mixture (2)+(3)]
3. 4,4'-dicarboxydiphenyl ether: 38.7 g
   [60 mole % in mixture.(2) +(3)]
4. para-acetoxybenzoic acid: 45 g
   [100 mole % relative to (1)]
5. magnesium acetate: 0.077 g
   [500 ppm].

Thereafter, the procedure of Example 1 was followed. A volume of 42 cm³ of acetic acid was recovered (98% of theory). The polymer obtained was white and fibrous in appearance. It had an inherent viscosity of 2.15 dlg⁻¹. Its flow temperature was 290° C. The anisotropy range extended from 300° C. to above 360° C. The results of the tensile, flexural and impact measurements are reported in Table 2 below.

EXAMPLE 3

The following materials were introduced into the same apparatus as that described in Example 1:
1. methylhydroquinone diacetate: 52.05 g
   [molar ratio (1)/(2)+(3)=1]
2. terephthalic acid: 16.6 g
   [40 mole % in mixture (2)+(3)]
3. 4,4'-dicarboxydiphenyl ether: 38.7 g

[60 mole % in mixture (2)+(3)]
4. para-acetoxybenzoic acid: 67.5 g
   [150 mole % relative to (1)]
5. magnesium acetate: 0.088 g
   [500 ppm].

Thereafter, the procedure of Example 1 was followed. A volume of 53 cm³ of acetic acid was recovered (95.4% of theory). The polymer obtained was white and fibrous in appearance. It had an inherent viscosity of 2.25 dlg⁻¹. Its flow temperature was 300° C. The anisotropy range extended from 300° C. to above 360° C. The results of tensile, flexural and impact measurements are reported in Table 2 below.

EXAMPLE 4

The following materials were introduced into the same apparatus as that described in Example 1:
1. methylhydroquinone diacetate: 52.05 g
   [molar ratio (1)/(2)+(3)=1]
2. terephthalic acid: 16.6 g
   [40 mole % in mixture (2)+(3)]
3. 4,4'-dicarboxydiphenyl ether: 38.7 g
   [60 mole % in mixture (2)+(3)]
4. para-acetoxybenzoic acid: 90 g
   [200 mole % relative to (1)]
5. magnesium acetate: 0.099 g
   [500 ppm].

Thereafter, the procedure of Example 1 was followed. A volume of 58 cm³ of acetic acid was recovered (96.7% of theory). The polymer obtained was white and fibrous in appearance. It had an inherent viscosity of 1.81 dlg³¹ ¹. Its flow temperature was 310° C. The anisotropy range extended from 315° C. to above 360° C. The results of tensile, flexural and impact measurements are reported in Table 2 below.

TABLE 2

| EXAMPLE/ TEST | TENSILE Strength (Mpa) | Modulus (Mpa) | FLEXURAL Modulus (Mpa) | CHARPY IMPACT (kJ/m²) |
| --- | --- | --- | --- | --- |
| A | 140 | 3,330 | 3,675 | 27 |
| 1 | 122 | 4,470 | 5,730 |  |
| 2 | 150 | 4,920 | 6,160 | 28 |
| 3 | 105 | 4,800 | 7,760 | 31.5 |
| 4 | 76 | 4,470 | 7,964 | 20.5 |

EXAMPLE 5

The following materials were introduced into the same apparatus as that described in Example 1:
1. chlorohydroquinone diacetate: 45.7 g
   [molar ratio (1)/(2)+(3)=1]
2. terephthalic acid: 16.6 g
   [50 mole % in mixture (2)+(3)]
3. 4,4'-dicarboxydiphenyl ether: 25.8 g
   [50 mole % in mixture (2)+(3)]
4. para-acetoxybenzoic acid: 12.24 g
   [34 mole % relative to (1)]
5. magnesium acetate: 0.0502 g
   [500 ppm].

The reactor was purged with nitrogen and then heated with a metal bath, controlled at 260° C., for 2 hours and 20 minutes. The volume of acetic acid distilled was 22 cm³ (i.e., 81.5% of theory). The temperature of the metal bath was then gradually raised to 330° C. over 40 minutes, while the pressure was reduced at the same time from 1,010 10² Pa to 0.39 10² Pa. After the distillation of acetic acid had ceased, the temperature was still maintained at 330° C. and the pressure at 0.39 10² Pa for 12 minutes 30 seconds. The total volume of acetic acid collected was 27 cm³ (i.e., 100% of theory).

The polymer obtained was greyish and fibrous in appearance. It had an inherent viscosity of 1.98 dlg⁻¹. Its flow temperature was 280° C. The anisotropy range extended from 280° C. up to above 360° C.

The values of tensile, flexural and impact measurements are reported in Table 3 below.

EXAMPLE 6

The following materials were introduced into the same apparatus as that described in Example 1:
1. chlorohydroquinone diacetate: 45.7 g
   [molar ratio (1)/(2)+(3)=1,004]
2. terephthalic acid: 13.21 g
   [40 mole % in mixture (2)+(3)]
3. 4,4'-dicarboxydiphenyl ether: 30.80 g
   [60 mole % in mixture (2)+(3)]
4. para-acetoxybenzoic acid: 48.82 g
   [135 mole % relative to (1)]
5. magnesium acetate: 0.0693 g
   [500 ppm].

Thereafter, the procedure of Example 5 was followed. After the distillation of acetic acid had ceased, the temperature was still maintained at 330° C. and the pressure at 0.39 10² Pa for 8 minutes 45 seconds. A volume of 37 cm³ of acetic acid was recovered (i.e., 97% of theory). The polymer obtained was greyish and fibrous in appearance. Its flow temperature was 275° C. The anisotropy range extended from 275° C. up to above 360° C. The values of tensile, flexural and impact measurements are reported in Table 3 below.

EXAMPLE 7

The following materials were introduced into the same apparatus as that described in Example 1:
1. chlorohydroquinone diacetate: 45.7 g
   [molar ratio (1)/(2)+(3) =0.991]
2. terephthalic acid: 16.74 g
   [50 mole % in mixture (2)+(3)]
3. 4,4'-dicarboxydiphenyl ether: 26.02 g
   [50 mole % in mixture (2)+(3)]
4. para-acetoxybenzoic acid: 22.28 g
   [62 mole % relative to (1)]
5. magnesium acetate: 0.055 g
   [500 ppm].

Thereafter, the procedure of Example 5 was followed. After the distillation of acetic acid had ceased, the temperature was still maintained at 330° C. and the pressure at 0.39 10² Pa for 12 minutes 30 seconds. A volume of 30 cm³ of acetic acid was recovered (i.e., 100% of theory). The polymer obtained was greyish and fibrous in appearance. Its flow temperature was 290° C. The anisotropy range extended from 290° C. up to above 360° C.

The values of tensile, flexural and impact measurements are reported in Table 3 below.

EXAMPLE 8

The following materials were introduced into the same apparatus as that described in Example 1:
1. chlorohydroquinone diacetate: 45.7 g
   [molar ratio (1)/(2)+(3)=1.008]
2. terephthalic acid: 16.46 g
   [50 mole % in mixture (2)+(3)]
3. 4,4'-dicarboxydiphenyl ether: 25.58 g
   [50 mole % in mixture (2)+(3)]
4. para-acetoxybenzoic acid: 22.28 g
   [62 mole % relative to (1)]
5. magnesium acetate: 0.055 g
   [500 ppm].

Thereafter the procedure of Example 5 was followed. After the distillation of acetic acid had ceased, the temperature was still maintained at 330° C. and the pressure at 0.39 10² Pa for 12 minutes 30 seconds. A volume of 29 cm³ of acetic acid was recovered (i.e., 96.9% of theory). The polymer obtained was greyish and fibrous in appearance. It had an inherent viscosity of 2.06 dlg⁻¹. Its flow temperature was 285° C. The anisotropy range extended from 290° C. up to above 360° C.

The values of tensile, flexural and impact measurements are reported in Table 3 below.

EXAMPLE 9

The following materials were introduced into the same apparatus as that described in Example 1:
1. chlorohydroquinone diacetate: 45.7 g
   [molar ratio (1)/(2)+(3)=1]
2. terephthalic acid: 16.6 g
   [50 mole % in mixture (2)+(3)]
3. 4,4'-dicarboxydiphenyl ether: 25.8 g
   [50 mole % in mixture (2)+(3)]
4. para-acetoxybenzoic acid: 37.8 g
   [105 mole % relative to (1)]
5. magnesium acetate: 0.063 g
   [500 ppm].

Thereafter, the procedure of Example 5 was followed. After the distillation of acetic acid had ceased, the temperature was still maintained at 330° C. and the pressure at 0.39 10² Pa for 12 minutes and 30 seconds. A volume of 34 cm³ of acetic acid was recovered (i.e., 97.6% of theory). The polymer obtained was greyish and fibrous in appearance. Its flow temperature was 290° C. The anisotropy range extended from 290° C. up to above 360° C.

The values of tensile, flexural and impact measurements are reported in Table 3 below.

TABLE 3

| EXAMPLE | TENSILE Strength (Mpa) | TENSILE Modulus (Mpa) | FLEXURAL Modulus (Mpa) | CHARPY IMPACT (kJ/m²) |
|---|---|---|---|---|
| 5 | 102 | 3,120 | 6,795 | 26.6 |
| 6 | 96 | 2,391 | 8,361 | 13.4 |
| 7 | 110 | 3,240 | 9,100 | 13.0 |
| 8 | 95 | 3,110 | 8,000 | 22.1 |
| 9 | 113 | 2,998 | 8,560 | 23.3 |

It should be noted that, for the above Examples 5 to 9, the temperatures of the melting chamber of the KAP press were as follows: Example 5: 320° C.; Example 6: 380° C.; Example 7: 330° C.; Example 8: 350° C.; Example 9: 390° C.

While this invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A moldable thermotropic aromatic copolyester having an inherent viscosity of at least 0.3 dlg⁻¹ and a flow temperature of from 200° to 350° C., comprising recurring structural units of the formulae (I), (II), (III) and (IV), wherein (I) is the structural unit:

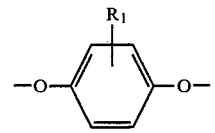

in which $R_1$ is methyl, ethyl, chlorine or bromide, said structural units (I) either being identical or different; (II) is the structural unit:

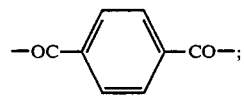

(III) is the structural unit:

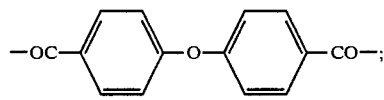

(IV) is the structural unit:

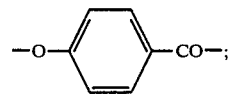

and further wherein the molar ratio of the structural units (I) relative to the total amount of the structural units (II)+(III) ranges from 0.95 to 1.05; the amount of the structural units (II) in the mixture of structural units (II)+(III) ranges from 0 to 70 mole % and the amount of the structural units (III) in said mixture ranges from 100 to 30 mole %; and the amount of the structural units (IV), relative to the amount of the structural units (I), ranges from 10 to 300 mole %.

2. The thermotropic aromatic polyester as defined by claim 1, wherein the amount of the structural units (II) in the mixture of structural units (II)+(III) ranges from 20 to 60 mole % and the amount of the structural units (III) in said mixture ranges from 80 to 40 mole %; and the amount of the structural units (IV), relative to the amount of the structural units (I), ranges from 30 to 200 mole %.

3. The thermotropic aromatic polyester as defined by claim 2, wherein the structural units (I) are identical, and $R_1$ is methyl or chlorine.

4. The thermotropic aromatic polyester as defined by claim 1, having a flow temperature of from 260° to 330° C.

5. The thermotropic aromatic polyester as defined by claim 1, further comprising aromatic dioxy structural units and/or aromatic dicarbonyl structural units and/or aromatic mixed oxy/carbonyl structural units other than those of the formulae (I), (II), (III) and (IV), the total amount of such structural units not exceeding 10 mole % relative to the amount of the structural units (I).

6. The thermotropic aromatic polyester as defined by claim 5, said further structural units comprising those of the formulae:

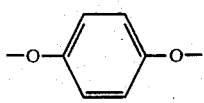
(I')

and/or

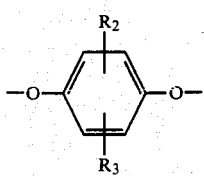
(I'')

wherein R₂ and R₃, which may be identical or different, are each R₁, and said units (I'') either being identical or different, and/or and/or

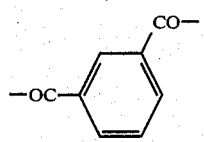
(II')

and/or

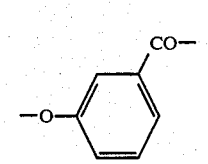
(IV')

7. A process for the preparation of the thermotropic aromatic polyester as defined by claim 1, comprising interreacting (1) a diester of methyl- and/or ethyl- and-/or chloro- and/or bromohydroquinone, optionally mixed with a diester or diesters of another diphenol, or of other diphenols, and/or at least one hydroquinone disubstituted with the aforesaid substituents, (2) optionally terephthalic acid itself or optionally mixed with another aromatic dicarboxylic acid, (3) 4,4'-dicarboxydiphenyl ether, and (4) an ester of para-hydroxybenzoic acid itself or optionally mixed with an ester of another aromatic hydroxy acid, the said diphenol diester and the said hydroxy acid ester being derived from an alkanoic acid containing from 2 to 6 carbon atoms, and further wherein the molar ratio diester(s) of diphenol(s)/total diacids ranges from 0.95 to 1.05, the amount of terephthalic acid in the mixture of terephthalic acid + 4,4'-dicarboxydiphenyl ether ranges from 0 to 70 mole %, the amount of ester of para-hydroxybenzoic acid ranges from 10 to 300 mole % relative to the amount of diester(s) of monosubstituted hydroquinone(s), and the total amount of said reactants, other than the diester(s) of monosubstituted hydroquinone(s), terephthalic acid, 4,4'-dicarboxydiphenyl ether and the ester of para-hydroxybenzoic acid, does not exceed 10 mole % relative to the amount of diester(s) of monosubstituted hydroquinone(s).

8. A shaped article comprising the thermotropic aromatic polyester as defined by claim 1.

9. The shaped article as defined by claim 8, comprising a fiber.

10. The shaped article as defined by claim 8, comprising a film.

11. The shaped article as defined by claim 8, comprising a molded shaped article.

* * * * *